United States Patent

Martin

(10) Patent No.: US 9,264,596 B2
(45) Date of Patent: Feb. 16, 2016

(54) SECURITY CAMERA SYSTEM AND METHOD FOR ELIMINATING VIDEO ABERRATIONS FROM EXCESSIVE IR ILLUMINATION

(71) Applicant: Sensormatic Electronics, LLC, Boca Raton, FL (US)

(72) Inventor: Walter A. Martin, Ballymena (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 443 days.

(21) Appl. No.: 13/661,298

(22) Filed: Oct. 26, 2012

(65) Prior Publication Data

US 2014/0118540 A1     May 1, 2014

(51) Int. Cl.
| | |
|---|---|
| H04N 7/18 | (2006.01) |
| H04N 9/64 | (2006.01) |
| H04N 13/02 | (2006.01) |
| G06K 9/00 | (2006.01) |
| G03B 17/00 | (2006.01) |
| H04N 5/225 | (2006.01) |
| H04N 5/235 | (2006.01) |
| H04N 5/21 | (2006.01) |

(52) U.S. Cl.
CPC .......... *H04N 5/2256* (2013.01); *H04N 5/2354* (2013.01); *H04N 5/21* (2013.01)

(58) Field of Classification Search
CPC ............ H04N 9/64; H04N 13/02; G06K 9/00
USPC .............. 348/47, 342, 370; 345/694; 382/152
See application file for complete search history.

(56) References Cited

U.S. PATENT DOCUMENTS

| | | | |
|---|---|---|---|
| 7,477,309 B2 * | 1/2009 | Cuccias | 348/342 |
| 2002/0067422 A1 | 6/2002 | Miura et al. | |
| 2005/0226472 A1 * | 10/2005 | Komura | 382/118 |
| 2006/0088201 A1 * | 4/2006 | Delaney | 382/152 |

FOREIGN PATENT DOCUMENTS

| | | |
|---|---|---|
| JP | 2004297645A | 10/2004 |
| KR | 1020080007719A | 1/2008 |
| WO | 2012117235A2 | 9/2012 |

OTHER PUBLICATIONS

International Search Report and Written Opinion of the International Searching Authority, mailed Nov. 25, 2013, from International Application No. PCT/US2013/058915, filed Sep. 10, 2013.

(Continued)

*Primary Examiner* — Sath V Perungavoor
*Assistant Examiner* — Patricia I Young
(74) *Attorney, Agent, or Firm* — HoustonHogle, LLP

(57) ABSTRACT

In a security camera system, the power to the illumination system is controlled based on the quality of the images generated by the imaging system. Specifically, the images in the frames detected by the imaging chip of the security camera are analyzed to determine whether or not there is adequate or inadequate power to the illumination system. The controller then changes the power to the illumination system until optimal illumination of the scene is achieved. Generally the power to the illumination system is reduced in response to increasing blur in the images or halos around edges in the images.

17 Claims, 4 Drawing Sheets

(56) References Cited

U.S. PATENT DOCUMENTS

| | | |
|---|---|---|
| 2008/0110994 A1* | 5/2008 | Knowles et al. ......... 235/462.42 |
| 2009/0201320 A1* | 8/2009 | Damberg et al. ............. 345/694 |
| 2010/0026785 A1* | 2/2010 | Soto-Thompson et al. .... 348/47 |
| 2010/0244708 A1 | 9/2010 | Cheung et al. |

OTHER PUBLICATIONS

International Preliminary Report on Patentability, mailed Jan. 22, 2015, from International Application No. PCT/US2013/058915, filed Sep. 10, 2013.

* cited by examiner

SECURITY CAMERA SYSTEM AND METHOD FOR ELIMINATING VIDEO ABERRATIONS FROM EXCESSIVE IR ILLUMINATION

BACKGROUND OF THE INVENTION

Many modern security camera systems have illumination systems for illuminating the scene from which the security camera captures images. Often, these illumination systems are activated at night so that parking lots or darkened hallways can be monitored even in the absence of other light sources.

It is also common that these security camera illumination systems used infrared diodes to illuminate the scene. Diodes are very power efficient. And, the use of infrared light illumination ensures that the cameras do not have a detrimental effect on individuals within the scene. The use of infrared illumination also reduces the obtrusiveness and visibility of the security camera systems.

Generally, to minimize the power consumed by the security camera systems and to provide optimal imaging conditions, the power to the illumination systems is controlled based on available light. As a result, if only moderate supplemental illumination is required, then the illumination systems of the security camera systems will only be operated at low power. Other times when the power to the illumination systems should be controlled are when the scene imaged by the security camera systems changes such that there are objects that are closer to the security camera or are possibly more reflective of infrared light. In these cases, the power to the illumination systems should be reduced to avoid saturating the imaging sensors or chips within the security camera systems that captures the frames of the scene.

Some security camera systems include photo sensors that detect light reflected from the scenes and then controllers of the security camera systems control the power to the illumination systems based on this reflected light. As result, when an object moves close to the security camera and reflects excessive light from the illumination system back into the imaging sensor, this reflected tight is detected by the photosensor. The controller then reduces the power to the illumination system.

SUMMARY OF THE INVENTION

The problem with using the separate photosensor to detect light returning from the scene from the illumination system is that it increases the overall cost of the security camera system. The photosensor must be placed on the front of the camera and isolated from direct light from the illumination system. Nevertheless, it must accurately detect light reflected from the scene. The cost of this photosensor along with the engineering challenges of properly locating it on the security camera system increases the overall cost.

The present invention is directed to a different approach for controlling the power to the illumination system. Specifically, the images in the frames detected by the imaging chip of the security camera are analyzed to determine whether or not there is adequate or inadequate power to the illumination system. The controller then changes the power to the illumination system until optimal illumination of the scene is achieved.

In general, according to one aspect, the invention features a security camera system comprising an imaging system for capturing frames of a scene. An infrared illumination system is provided for illuminating the scene. Finally, a controller analyzes images of the frames and then controls a power provided to the infrared illumination system based on the analysis of the images.

In the preferred embodiment, the illumination system comprises one or more infrared diodes. A driver is used to control the power to the infrared diodes.

Preferably, the controller analyzes the images of frames for the presence of blur and decreases the power provided to the infrared illumination system in response to increasing blur in the images. On the other hand, the controller increases the power provided to the infrared illumination system and then determines whether or not the increased power increased blur in the images of the frames. This is helpful to ensure that the best illumination conditions are always achieved. Nevertheless, the controller then reduces the power provided to the infrared illumination system in response to increased blur in the frames.

According to one aspect, increase in blur is checked when the illumination system is first activated at nighttime, for example. Specifically, the controller determines whether infrared illumination is required, and then activates the infrared illumination system. The images of the frames are analyzed for blur. A power provided to the infrared illumination system can then be reduced in response to increasing blur in the frames in response to activation of the illumination system.

In one example, the controller determines blur in the images based on contrast within the images of the frames. In another example, the controller determines blur in the images based on halos within images of the frames.

In general, according to another aspect, the invention features a method of operation of a security camera system. The security camera system includes an imaging system for capturing frames of a scene, an infrared illumination system for illuminating the scene, and a controller that analyzes the frames of the scene. The method comprises the controller analyzing images of the frames for blur and then controlling a power provided to the infrared illumination system based on the measure of blur.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
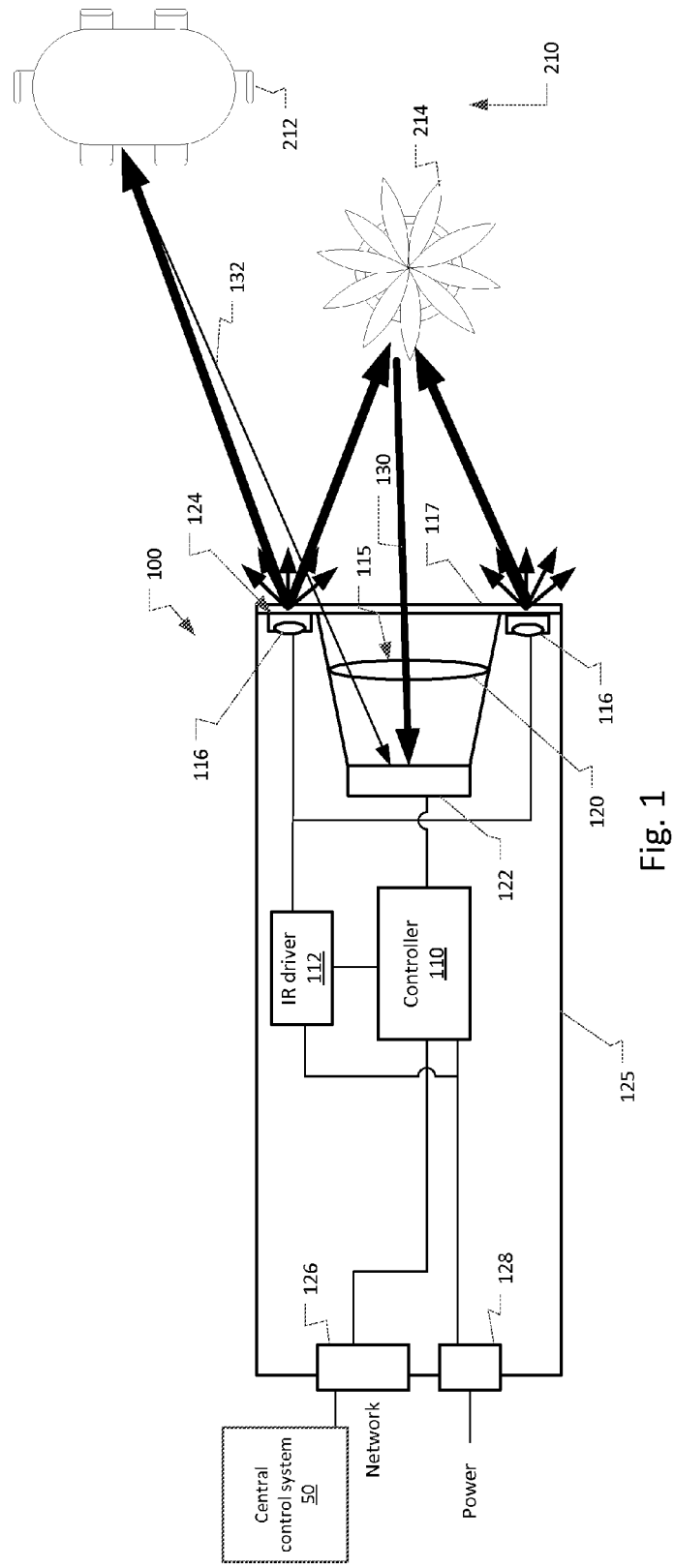
FIG. 1 is a schematic cross-sectional view of a security camera system to which the present invention is applicable.

FIG. 1 illustrates a security camera system 100 to which the present invention is applicable.

As is common, the security camera system 100 comprises an imaging system 115. This imaging system 115 captures frames that contain images of the scene 210. Light from the scene 210 passes through a transparent front cover 117, of the camera system body 125. The light is then imaged by an imaging lens system 120 on to an imager chip or sensor 122.

As is also common the security camera system 100 further comprises an infrared illumination system 124. This illumination system 124 comprises one or more infrared light emitting diodes (LEDs) that are typically arrayed around the entrance aperture of the imaging system 115 of the security camera 100.

The frames containing the images of the scene 210 that are generated by the imager chip 122 are provided to a controller 110. In some examples, the controller 110 performs video analytics on the images captured by the imager chip 122. Moreover, typically, the controller 110 forwards the frames to a central control system 50. Often, the images or video images are stored on a network video recorder (NVR) or further analyzed by the central control system 50.

The frames from the security camera system 100 are typically transferred to the central control system through a network. In one example, the security camera system 100 is provided with a network interface such as an Ethernet internet protocol (IP) interface 126 that allows the network security camera 100 to be connected to a data network to allow communication between the central control system 50 and the controller 110 of the camera system 100.

Power is provided to the camera system 100, including the controller 110, through a power interface 128. In some examples, this is a separate connector located on the body 125 of the security camera system 100. In another example, the power is provided on a power over Ethernet (POE) interface.

The controller 110 controls the power provided to the infrared LEDs 116 of the infrared illumination system 124 via an infrared driver 112 that is also powered via the power interface 128. Specifically, the controller 110 analyzes the images of the frames generated by the imager chip 122 and controls the power provided to the infrared illumination system 124 based on this analysis of those images.

Generally, the power provided to the infrared illumination system 124 should be optimized to ensure that adequate illumination of the scene is provided. Yet the illumination should not be on strong that it impairs the ability of the imager chip 122 to detect the images of the scene 210 without aberration.

As illustrated, the scene 210 may include a combination of objects. Some of these objects such as plant 214 may be relatively close to the security camera system 100, whereas other objects such as the table 212 may be more distant. Close objects such as the plant 214 can cause high levels of light from the illumination system 124 to be reflected into the imager chip 122, see arrow 130. In contrast, the objects, such as table 212, that are more distant from the security camera system 100 produce only weak reflected light levels on the imager chip 122, see arrow 132. When objects are close, and also when they are highly reflecting, it can cause excessive light from the illumination system 124 to be reflected into the imager chip 122. This can cause image aberrations such as saturation of the imager chip and/or cause stray light reflections within the imaging system 115. The net result is that objects within the scene can appear less sharp as if they are out of focus and/or a halo can appear around the edges of those objects within the images of the frames captured by the imager chip 122.

Figure 2:
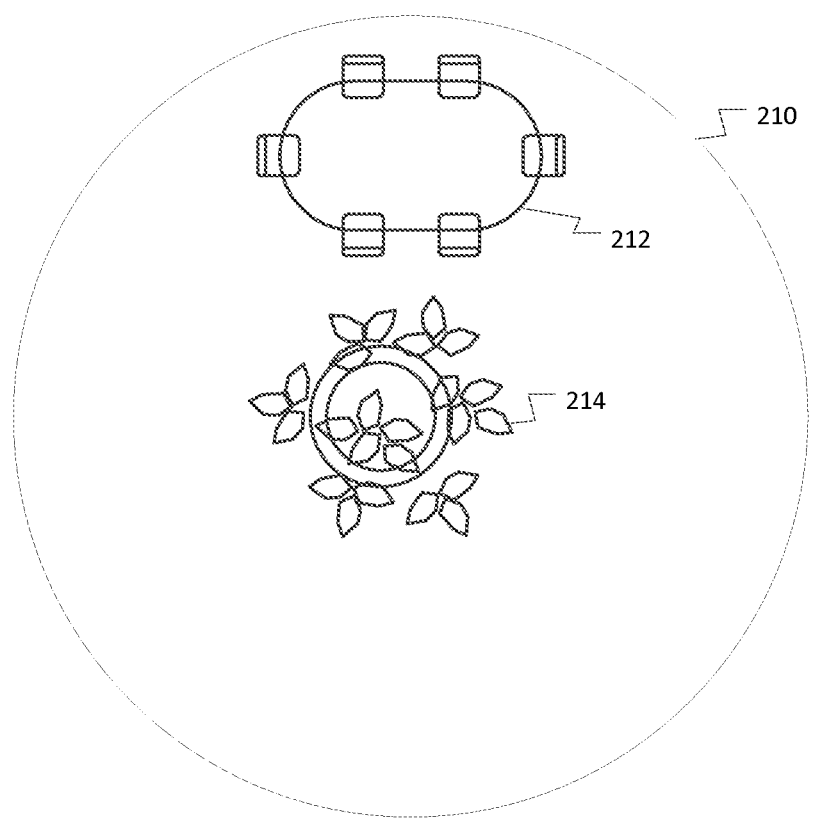
FIG. 2 illustrates an exemplary image of a scene captured by the security camera system.
Figure 3:
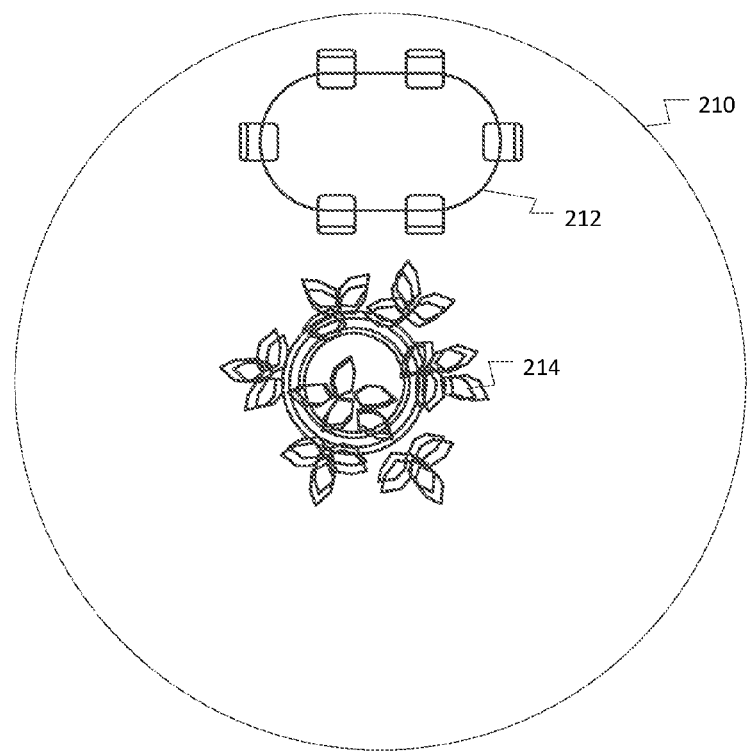
FIG. 3 illustrates an exemplary image of the scene captured by the security camera system that exhibits a halo around an object in the scene.
Figure 4:
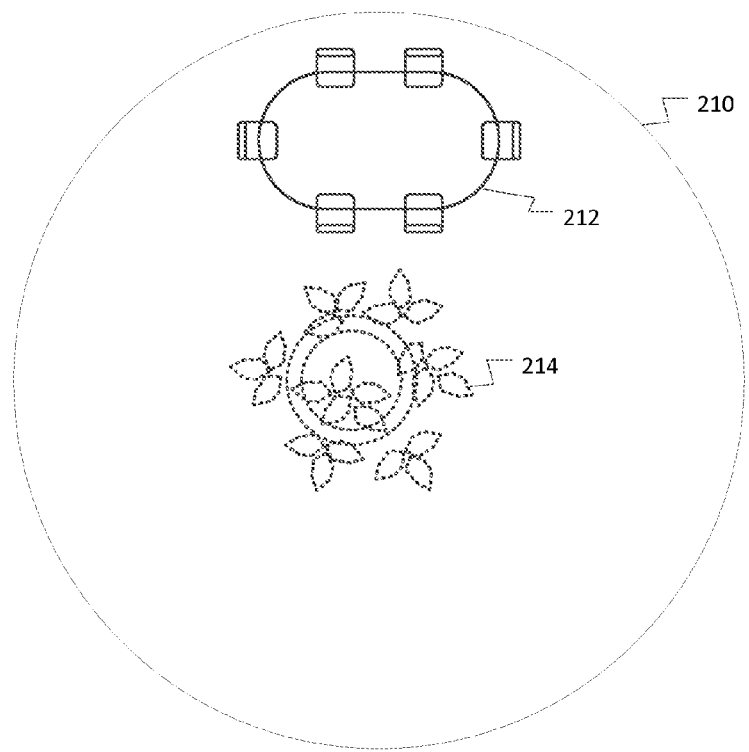
FIG. 4 illustrates an exemplary image of the scene captured by the security camera system that exhibits blurring of an object in the scene.

FIGS. 2-4 illustrate these image aberration effects. Specifically, FIG. 2 shows an image of a frame that has adequate illumination. The edges of the plant 214 and the table 212 appear sharp and well defined within the scene 210.

In contrast, the image of the scene illustrated in FIG. 3 shows the close object, plant 214, exhibiting a halo around the edges of the object within the scene 210. This is a common effect when there is too much illumination.

FIG. 4 shows a similar effect. Here the image of the close object, plant 214, is exhibiting reduced edge sharpness or blur.

Figure 5:
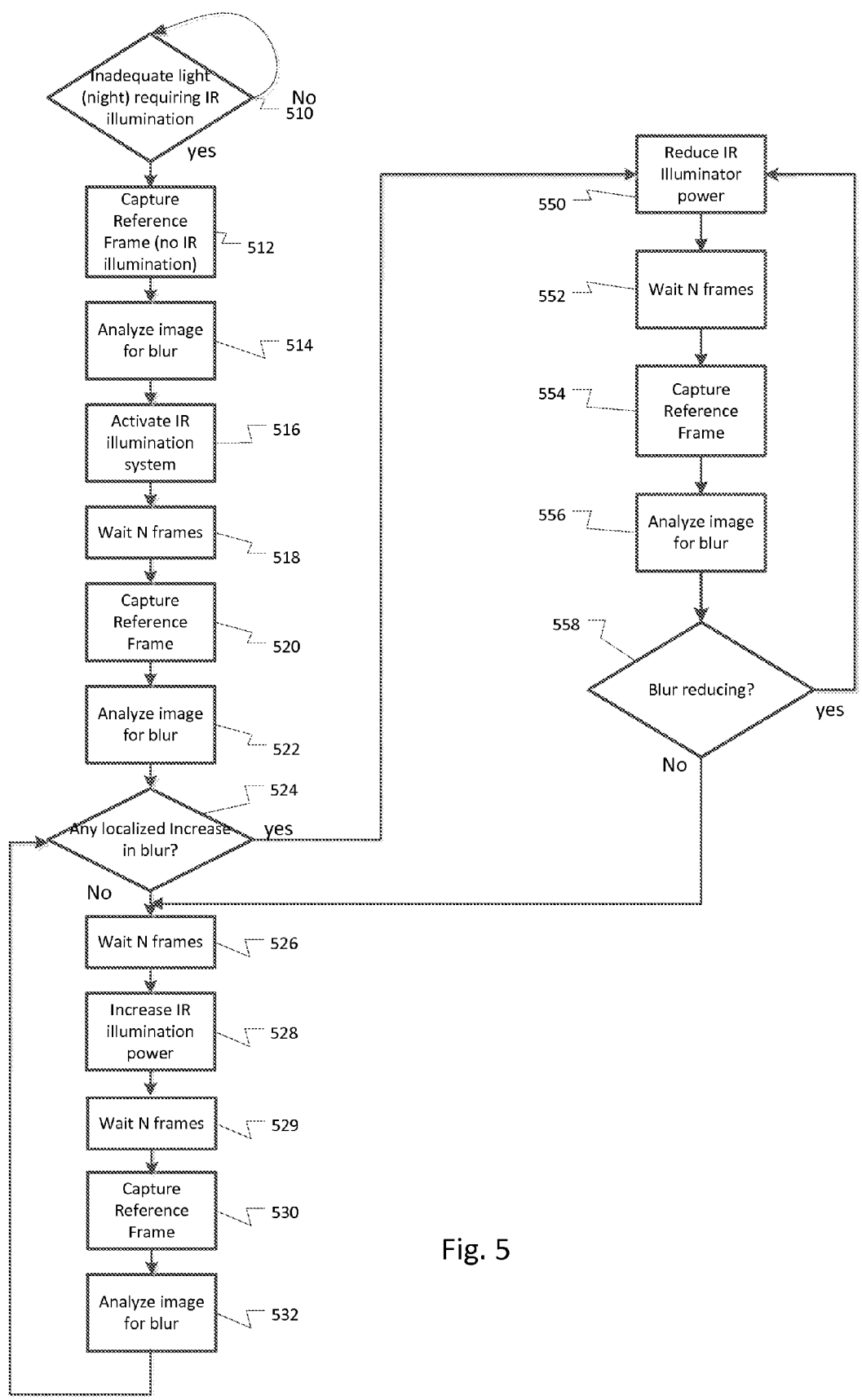
FIG. 5 is a flow diagram illustrating the operation of the security camera system according to the preferred embodiment of the present invention.

FIG. 5 illustrates the method of operation of the security camera system 100.

In more detail, when the illumination system 124 is not activated, the controller 110 of the security camera system 100 analyzes the images of the frames captured by the imager chip 122 to determine whether or not there is inadequate ambient light in the scene 210, in step 510.

When it is determined that there is inadequate ambient light to enable the imager 122 to accurately and effectively generate an image of the scene, then a reference frame is captured in step 512 under the conditions of no infrared illumination by the infrared illumination system 124. Generally inadequate illumination is determined by looking at the response of each pixel and whether their responses are below a threshold.

This captured image under the non-illumination condition is then analyzed for the presence of blur in step 514. In one embodiment, the image is analyzed by the controller 110 for blur such as by using an edge sharpness autofocus or blur detection algorithm. In one example, the controller assesses the level of blur by analyzing spatial contrast changes within the image.

In another embodiment, the image is analyzed by the controller 110 for objects within the image that exhibit a halo effect or similar aberration. Then in step 516, the infrared illumination system 124 is activated.

In step 518, the controller 110 waits a number of frames. This allows for a settling time in the operation of the illumination system 124 so that the illumination system reaches a steady-state illumination under the initial power that is provided by the driver 112.

In step 520, a new reference frame is captured. This new reference frame is also analyzed for blur in step 522.

In step 524, the controller 110 determines whether or not there has been any increase in blur between the reference frame captured in step 512 under no IR illumination and the reference frame captured in step 520 after the illumination system 124 has been activated.

Assuming that there is no increase in blur, then the controller 110 waits again in step 526 and then increases the power provided to the infrared illumination system 124, in step 528. The controller 110 then again waits in step 529 for the illumination level provided by the illumination system 124 to settle to its new steady-state level. And, a new reference frame is captured in step 530. This new reference frame is analyzed for blur in step 532. Then in step 524, it is again determined whether or not there has been any localized increase in blur due to the increase in illumination power performed in step 528.

In general, steps 524 through 532 have the effect of constantly increasing the power to the infrared illumination system 124 until it is determined that this increased power increases aberrations such as by increasing blur in the image that is captured by the imaging system 115. Generally, the goal is to maximize the power to the illumination system 124 to the point just before aberrations occur such as an increase in blur or halos around edges in the objects within the scene 210.

On the other hand, if it is determined that there was an increase in blur in step 524, then the power to the illumination system 124 is incrementally reduced in step 550. Again, the controller then waits a number of frames in step 552 to allow the illumination power to settle to a steady-state level.

Then a new reference frame is captured in step 554. This new reference frame is analyzed for blur in step 556.

If it is determined that blur has improved, i.e., blur had decreased, in step 558 due to the decrease in power to the illumination system 124, then the process repeats and the power is then reduced again in step 550. On the other hand, if blur has not improved in step 558, then the flow returns to step 526 again. Here the security camera system 100 then goes through the process of trying to increase the illumination power to ensure that the illumination is at the maximum illumination before there is degradation in the quality of the images generated by the imaging system 115.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security camera system comprising:
    an imaging system for capturing frames of a scene;
    an infrared illumination system for illuminating the scene;
    a controller for analyzing images of the frames for objects in the scene exhibiting image aberrations in the captured frames of the scene and controlling a power provided to the infrared illumination system, which illuminates the scene, based on the analysis of objects in the images;
    wherein the controller increases the power provided to the infrared illumination system, waits for a settling time for the infrared illumination system to reach steady-state illumination, and then determines whether or not the increased power increased image aberrations in the images of the frames.

2. A security camera system as claimed in claim 1, wherein the illumination system comprises one or more infrared light-emitting diodes.

3. A security camera system as claimed in claim 2, further comprising a driver that provides the power to the infrared diodes under the control of the controller.

4. A security camera system as claimed in claim 1, wherein the controller analyzes the images of the frames and decreases the power provided to the infrared illumination system in response to increased image aberrations in the images.

5. A security camera system as claimed in claim 1, wherein the controller reduces the power provided to the infrared illumination system in response to increased image aberrations in the frames.

6. A security camera system as claimed in claim 1, wherein the controller determines whether infrared illumination is required, activates the infrared illumination system, analyzes the images of the frames for image aberrations and decreases a power provided to the infrared illumination system in response to increasing image aberrations of the frames in response to activation of the illumination system.

7. A security camera system as claimed in claim 1, wherein the controller determines image aberrations in the images based on contrast within the images of the frames.

8. A security camera system as claimed in claim 1, wherein the controller analyzes the objects in the image for halos.

9. A method of operation of a security camera system including an imaging system for capturing frames of a scene, an infrared illumination system for illuminating the scene, and a controller that analyzes the frames of the scene, wherein the method comprises:
    the controller analyzing images of the frames for blur and/or aberrations associated with objects in the images of the frames of the scene;
    controlling a power provided to the infrared illumination system that illuminates the scene based on blur and/or aberrations associated with objects in the images of the frames of the scene by increasing a power to the infrared illumination system and then determining whether or not blur has increased and reducing power to the infrared illumination system in response to increasing blur; and
    when changing a power to the infrared illumination system, waiting for a level of illumination to stabilize before capturing a reference frame that is used to determine blur.

10. A method as claimed in claim 9, wherein the controller analyzing the images comprises the controller determining blur in the images based on spatial contrast changes within the images of the frames.

11. A method as claimed in claim 9, wherein the controller analyzing the images comprises the controller determining blur and/or aberrations in the images based on halos within the images of the frames.

12. A method as claimed in claim 9, further comprising the controller determining whether the scene is inadequately lit and activating the infrared illumination system.

13. A method as claimed in claim 12, further comprising capturing a reference frame and analyzing the image of the reference frame for blur and then reducing the power to the infrared illumination system in response to increasing blur due to the activation of the infrared illumination system.

14. A method as claimed in claim 9, further comprising reducing a power provided to the infrared illumination system in response to reduced blur in the images of the frames.

15. A method of operation of a security camera system including an imaging system for capturing frames of a scene, an infrared illumination system for illuminating the scene, and a controller that analyzes the images of the frames of the scene, wherein the method comprises:
    controller determining image aberrations associated with objects in the images in the captured frames of the scene; and
    controlling a power provided to the infrared illumination system, which illuminates the scene, based on image aberrations associated with objects in the images, including determining whether the scene is inadequately lit and activating the infrared illumination system and capturing a reference frame of the scene and analyzing the image of the reference frame for image aberrations associated with objects and then reducing the power to the infrared illumination system to reduce illumination of the scene in response to increasing image aberrations associated with objects due to the activation of the infrared illumination system and increasing a power to the infrared illumination system and then determining whether or not image aberrations have increased and reducing power to the infrared illumination system in response to increasing image aberrations and when changing a power to the infrared illumination system, waiting for a level of illumination to stabilize before capturing the reference frame that is used to determine image aberrations.

16. A security camera system as claimed in claim 1, wherein the controller captures a reference frame, analyzes an image of the reference frame for localized blur for objects within the image, in response to detecting localized image aberrations within the image, decreases power provided to the infrared illumination system, and then analyzes an image of a new reference frame for localized image aberrations.

17. A method as claimed in claim 9, wherein the controller analyzing the images for blur comprises capturing a reference frame and analyzing an image of the reference frame for localized blur for objects within the image, and then analyzing an image of a new reference frame for localized blur, and controlling a power to the infrared illumination system comprises in response to detecting localized blur within the image, decreasing power provided to the infrared illumination system, and then analyzing an image of a new reference frame for localized blur.

\* \* \* \* \*